June 16, 1964     E. R. ELLIOTT     3,137,637
FUEL ELEMENTS FOR NUCLEAR REACTORS
Filed Nov. 24, 1958
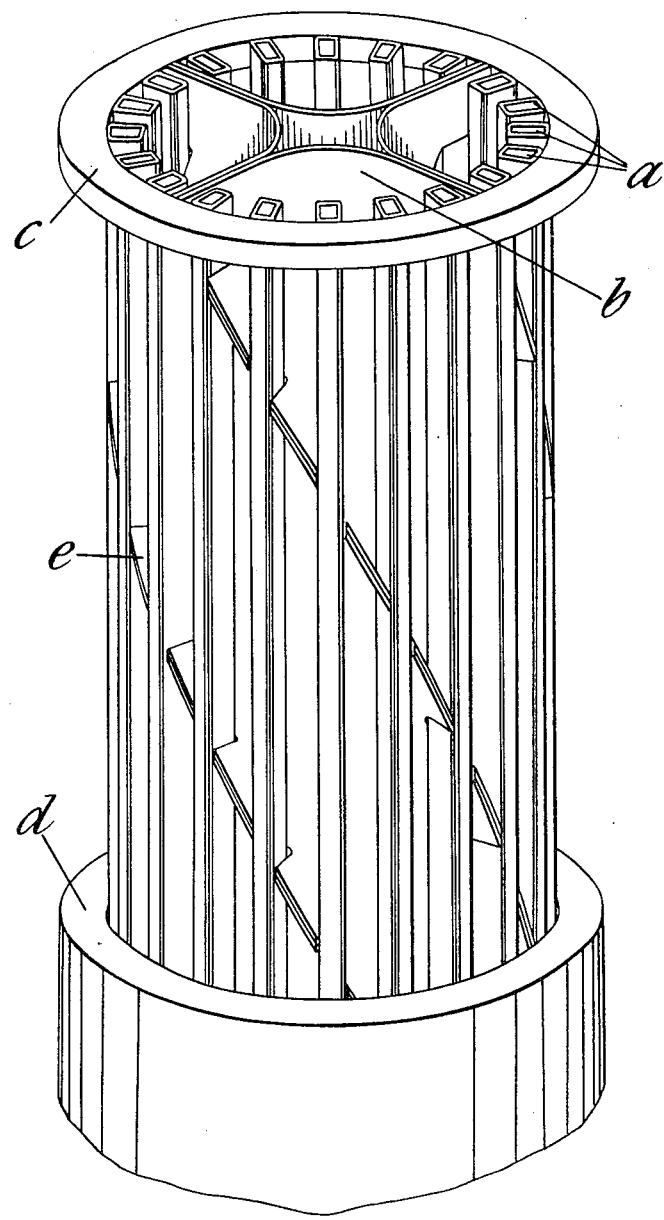

United States Patent Office 3,137,637
Patented June 16, 1964

3,137,637
FUEL ELEMENTS FOR NUCLEAR REACTORS
Edward Rae Elliott, Newcastle-upon-Tyne, England, assignor to C. A. Parsons & Company Limited, Newcastle-upon-Tyne, England
Filed Nov. 24, 1958, Ser. No. 775,900
Claims priority, application Great Britain Jan. 13, 1958
5 Claims. (Cl. 176—78)

This invention relates to fuel elements for nuclear reactors in which reactors nuclear fuel is enclosed in a plurality of containers generally referred to as fuel elements over the surface of which a cooling fluid is passed. As the operating temperature of reactors is raised the materials used for enclosing the fuel must not only be able to withstand the higher temperature but at the same time their neutron absorbing properties must still be low.

With temperatures of the order of 500° C. and above the only suitable materials at present available are those which are, in general, difficult to form or shape, for example, beryllium.

In reactors operating at lower temperature it has been possible to use materials such as magnesium alloys, and these are relatively easy to machine and form. Accordingly, in order to obtain maximum heat transfer it was possible to form fins of a rather intricate shape on the outside of containers made from such materials.

In co-pending patent application 618,258, for example, is described a tubular fuel element for a nuclear reactor which consisted of a container for the fuel having helical fins disposed about its longitudinal axis and the flow channels thus formed between the fins were interrupted by axially extending baffles. This construction induced a certain flow pattern of the cooling fluid over the element in which the cooling fluid tended to flow over the surface in a helical path about an axis which was itself a helix. This we found resulted in much improved heat transfer over conventional fin arrangements.

In co-pending patent application No. 768,786, now abandoned, is described a nuclear reactor element formed of a plurality of tubes, each containing nuclear fuel, which are helically disposed around a common axis and enclose a space which is partitioned off into separated flow channels by an axially extending member having radially extending walls which extend into contact with the tubes.

The object of the present invention is to provide a further fuel element over which the cooling fluid can be induced to flow in a substantially similar fashion to that of two co-pending applications referred to above and yet as in co-pending application No. 768,786 does not need fins formed thereon.

The invention consists in a nuclear reactor fuel element for insertion in a bore of a reactor core which element comprises a series of straight nuclear fuel containing tubes arranged to form a tubular framework with the tubes parallel to the longitudinal axis of the framework and an axially extending support member having radially extending walls which support the tubes, baffle the spaces between the tubes and are helically disposed with respect to the longitudinal axis of the framework.

The invention also consists in a nuclear reactor fuel element in accordance with the preceding paragraph in which the radially extending walls have recesses or apertures adapted to receive the tubes; or in which the support member has a hub containing an aperture through which a control rod can be passed; or in which the element is enclosed by a graphite sleeve fitting over the tubes, and may be held in position by a flange at each end of the element; or in which several rows of tubes are arranged in radial alignment.

The accompanying drawing illustrates one form of the present invention.

In carrying the invention into effect in the form shown by way of example a fuel element comprises a plurality of tubes each containing nuclear fuel, for example, uranium oxide. The arrangement and other details are similar to those of co-pending application No. 768,786 but the tubes are straight and disposed about a common axis; they extend axially of the element and are spaced apart from each other to permit the flow of cooling fluid around each tube.

The tubes when in position enclose a cylindrical space in which is located an axially extending support member which has a number of radially extending walls.

The axially extending support member is twisted about its axis so that the radially extending walls follow a helical path. These walls extend into contact with the tubes and divide the space into a series of separate flow channels for cooling fluid.

In the preferred arrangement these radially extending walls have a series of slots cut in them adapted to receive the tubes.

The tubes are joined or bonded to rings at each end of the element.

The axially extending support member may have a central hub containing a hole through which a control rod can be passed when the fuel element is in the reactor.

The tubes may be circular or elliptical or in a form having straight sides and rounded edges, or they may be rectangular. In addition there may be rows of tubes in radial alignment. The tubes are preferably made from material which will withstand high temperatures of the order of 500° C. and above, and suitable materials are beryllium and stainless steel.

The element is intended for location in a cooling duct in a reactor through which duct a cooling fluid flows. In gas-cooled graphite moderated reactors to which the invention has particular application, the elements are located in a series of bores or channels formed in the graphite moderator and a cooling gas, for example, carbon dioxide, flows over the surface of the elements.

Cooling gas enters the element in an axial direction and is directed into a helical path owing to the disposition of the tubes, the extending support member and the radially extending walls so that in effect the cooling fluid progresses spirally along the element. In so doing it tends to flow in a helical path until it meets a radially extending wall of the axially extending member when it is deflected radially inwards along the surface of the wall and then radially outwards along the surface of an adjacent wall, in a helical path the axis of which is parallel to the axis of the element, until it contacts the tubes again. The net result is a flow pattern substantially similar to that achieved according to co-pending application No. 618,258 by the use of fins, and according to co-pending application No. 768,786 by the use of twisted tubes.

It is possible to reduce the pressure drop in the flow channels of the reactor core without exceeding the maximum permissible temperature on the fuel element by increasing the lead of the helix which the axially extending support member follows at the inlet end and decreasing it gradually towards the outlet end; for example, the axially extending support member could be almost parallel to the axis at the inlet end and then gradually the lead of the helix is increased towards the outlet end.

The element is particularly suitable for high temperature reactors as high temperature resisting metals can be used for the tubes and no fins or machining of the material is required. Further the tubes can readily be filled with enriched fuel in compacted powder form.

If carbon dioxide is to be used as the coolant at temperatures above 500° C. in a graphite moderated reactor then it may be necessary to take precautions against attacks by the $CO_2$ on the graphite moderator block. By fitting a graphite sleeve over the outer periphery of the element and attaching it to the element the attacks on the moderator blocks can be reduced.

The graphite sleeve can be supported between end flanges on the element but spaced from the tubes. When in position in the moderator a small gas space may be left between the graphite sleeve and the moderator or main moderator block to prevent overheating of the main moderator block by the element. This gap may be large enough to permit an axial flow of cooling gas between graphite sleeve and the graphite moderator block.

The aforesaid drawing has tubes $a$, axially extending member $b$, end ring $c$ and graphite sleeve $d$, the radial walls of the axially extending member $b$ being bent in a helical fashion as indicated at $e$.

I claim:

1. A nuclear reactor fuel element for insertion in a bore of a reactor core through which bore a cooling fluid flows which element comprises a series of straight nuclear fuel containing tubes arranged to form a tubular framework with the tubes parallel to the longitudinal axis of the framework and an axially extending support member having radially extending walls which extend to the outer periphery of the framework, support the tubes, baffle the spaces between the tubes and are helically disposed with respect to the longitudinal axis of the framework.

2. A nuclear reactor fuel element as claimed in claim 1, in which the radial extending walls have openings receiving the tubes.

3. A nuclear reactor fuel element as claimed in claim 1, in which the support member has a hub containing an aperture receiving a control rod.

4. A nuclear reactor fuel element as claimed in claim 1 in graphite moderated reactors in which the element is enclosed by a graphite sleeve fitting over the tubes and held in position by a flange at each end of the element.

5. A fuel element as claimed in claim 1, in which several rows of tubes are arranged in radial alignment.

References Cited in the file of this patent

UNITED STATES PATENTS

| | | |
|---|---|---|
| 2,287,066 | Rogers | June 23, 1942 |
| 2,385,080 | Heymann | Sept. 18, 1945 |
| 2,874,940 | Ahlen | Feb. 24, 1949 |
| 2,831,807 | McGarry | Apr. 22, 1958 |
| 2,879,216 | Hurwitz et al. | Mar. 24, 1959 |